April 4, 1961
R. L. HALL ET AL
2,978,377
BONDING BUTADIENE VINYLPYRIDINE
FORMULATIONS TO METAL
Filed Oct. 3, 1955
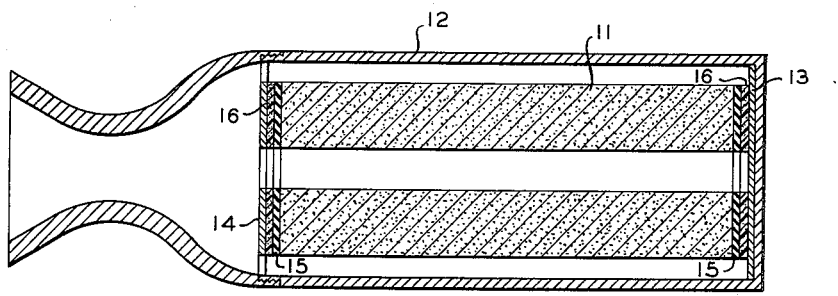
FIG. 3.
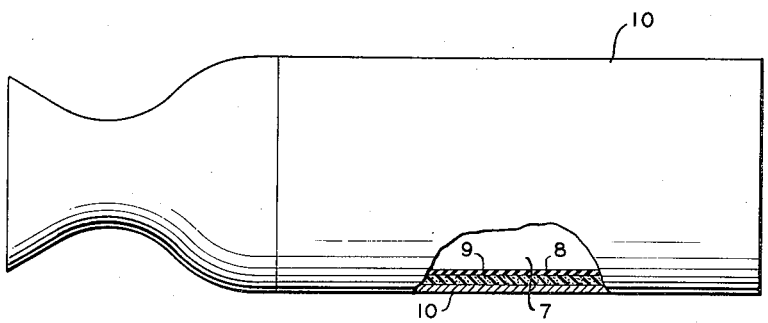
FIG. 2.
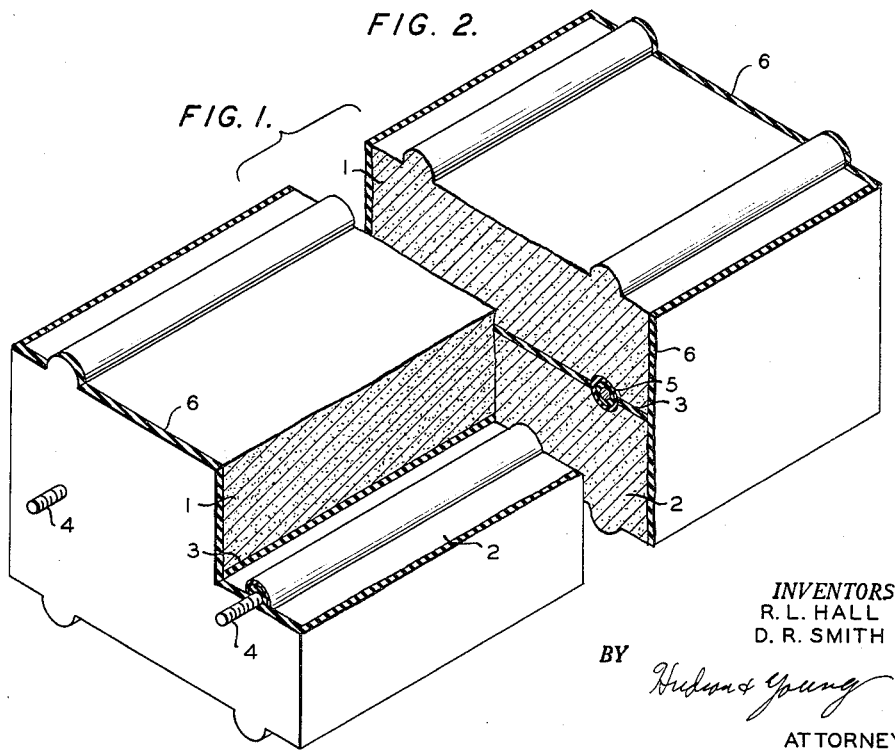
INVENTORS
R. L. HALL
D. R. SMITH
BY *Hudson & Young*
ATTORNEYS

United States Patent Office 2,978,377
Patented Apr. 4, 1961

2,978,377

BONDING BUTADIENE VINYLPYRIDINE FORMULATIONS TO METAL

Robert L. Hall, Fort Huachuca, Ariz., and David R. Smith, Bartlesville, Okla., assignors to Phillips Petroleum Company, a corporation of Delaware Filed Oct. 3, 1955, Ser. No. 538,079

12 Claims. (Cl. 154—129)

This invention relates to a method of bonding a conjugated diene-vinylpyridine formulation to a surface and to the bonded article. In one of its aspects, this invention relates to the bonded grain and a method of bonding a composite propellant grain wherein the binder is a conjugated diene-vinylpyridine copolymer to its metal support.

The art has developed many compositions for bonding rubber to metal. A rubber composition comprised of a copolymer of butadiene and a vinylpyridine such as 2-methyl-5-vinylpyridine has been used as such a bonding agent and when used with natural rubber or a GR–S (1,3-butadiene-styrene) formulations an excellent bond is obtained. However, we have found that when such a formulation is used to bond a cured butadiene-vinylpyridine formulation to metal or other surface, the bonding composition makes only a fair bond to the cured rubber.

In the case of a composite propellant grain wherein the binder of said grain is a vinylpyridine-butadiene copolymer, it is necessary that the bonding agent adhere firmly to the grain to prevent isolated burning along the grain surface since such burning develops large volumes of gases and the build up of pressure might rupture the case and would, in any case, result in erratic performance of the rocket engine in which such grain is employed. In a rocket engine employing a solid propellant grain, the coefficient of expansion of the metal case and that of the grain is quite different and during temperature cycling, the grain frequently pulls away from the case.

An object of this invention is to provide a method of bonding a butadiene-vinylpyridine composition to a surface.

Another object of this invention is to provide an article comprised of a butadiene-vinylpyridine composition having an improved bond to a surface.

Another object of this invention is to provide an improved means of bonding a propellant grain wherein the binder of said grain is a butadiene-vinylpyridine copolymer to its metal support.

Still another object of this invention is to provide an improved bonded propellant grain; and Still other objects and advantages of this invention will be apparent to those skilled in the art having been given this disclosure.

According to this invention, the conjugated diene-vinylpyridine copolymer is first coated on the surface to be bonded with a layer of conjugated diene polymer or copolymer, e.g. butadiene-styrene copolymer and the thus coated surface is bonded to the surface to which said first copolymer is to be bonded with a copolymer of conjugated diene-vinylpyridine.

We have found that a bond prepared by the method of this invention results in a much superior bond than is obtained when bonding the conjugated diene-vinylpyridine copolymer by the use of a similar copolymer bonding agent.

The propellant grains to which this invention are applicable are composite grains comprising an oxidant such as ammonium nitrate, ammonium perchlorate, and potassium perchlorate held together by a binder wherein the binder is a copolymer of a conjugated diene and a vinylpyridine. Such grains are well known in the art.

For the purpose of this disclosure, the word binder refers to the matrix in which the other ingredients reside. Bonding agent refers to the material sealing the grain or butadiene/MVP copolymer to some other surface.

The propellant grain to which this invention is particularly applicable can be prepared by any method known to the art, e.g. extrusion, molding, casting, etc. The copolymer is generally extruded with an oxidizing agent uniformly dispersed therein. The preferred oxidizers of the art are potassium perchlorate and ammonium nitrate since they both contain a large amount of oxygen available for combustion, because of their stability both alone and in combination with plastic fuels, and because of their commercial availability at a comparatively low price. However, other oxidizing agents such as other perchlorates have been used.

In general, about 1–9 parts oxidizer per part binder by weight is used. That is, this amount of oxidizer to one part copolymer produces a propellant which is sufficiently plastic, substantially impermeable, and at the same time contains the desired amount of oxidant. In any case, the oxidant will most generally be in the range of 50 to 90 percent by weight of the entire charge.

The propellant can be of the external burning type, the internal burning type, the internal-external burning type or one burning only on one surface. An internal burning propellant and one burning only on one surface is sealed in the engine by filling the annulus between the grain and engine with a sealant. External burning grains are conveniently prepared in two sections and sealing the two sections together with iron rods between the two sections, these iron rods being used to support the composite grain in the engine, and the internal-external grains will sometimes be sealed to the engine at one end thereof and to a metal spider which supports the grain in the engine at the other end thereof.

This invention is for sealing means and is not limited to any particular composition or shape and is equally applicable to sealing other vinylpyridine compositions to other materials as well as to sealing one object of said vinylpyridine composition to another article of similar composition.

Many vinylpyridine-conjugated diene copolymers are also well known in the art and many polymerization recipes are known such as thermal, solution, mass and emulsion polymerization. A copolymer prepared by any of these methods is applicable to this invention. Such copolymers can comprise 1 to 99 parts per hundred parts monomer of the conjugated diene or 99 to 1 per hundred parts monomer of the vinylpyridine as copolymerized and such copolymers can comprise one or more additional monomers copolymerized therewith. In any case, the copolymer will have vinylpyridine as a component of the polymer. In the case of the binder, the copolymer should comprise at least 50 weight percent conjugated diene and preferably will comprise at least 75 percent conjugated diene and 5 to 25 percent vinylpyridine. Such parts of conjugated diene and vinyl-pyridine are also preferred for the bonding agent. However, it is not as important in the bonding agent and the material being bonded as it is in the case of a propellant grain bonding agent. It will be understood by those skilled in the art that in the copolymer of these materials, the conjugated diene and the vinylpyridine do not exist as such but have been joined through the double bonds.

One convenient method of preparing polymers and copolymers is that of emulsion polymerization.

The following recipes are given as examples of typical emulsion polymerization recipes that can be employed for preparing the polymers or copolymers useful in our invention. Specific formulae are presented in the examples.

RECIPE 1

| | Parts by weight |
|---|---|
| Monomers | 100 |
| Water | 150–200 |
| Modifier | Variable |
| Emulsifier | 2–6 |
| Diazothioether | 0.5–5 |

RECIPE 2

| | Parts by weight |
|---|---|
| Monomers | 100 |
| Water | 150–200 |
| Modifier | Variable |
| Hydroperoxide | 0.1–10 |
| Emulsifier | 2–6 |
| Sugar (optional) | 0.1–5 |
| Alkali-metal pyrophosphate | 0.1–1 |
| $Fe_2SO_4 \cdot 7H_2O$ | 0.1–1 |

RECIPE 3

| | Parts by weight |
|---|---|
| Monomers | 100 |
| Water | 150–200 |
| Electrolyte (optional) | 0.1–5 |
| Alkali metal hydroxide (optional) | 0.1–1 |
| Emulsifiers | 2–6 |
| Modifiers | Variable |
| Hydroperoxide | 0.1–10 |
| Polyalkene polyamine | 0.1–2 |

The polymeric material useful as the bonding material to the vinylpyridine containing copolymer will comprise at least 50 weight percent conjugated diene with the remaining material being a vinyl aromatic hydrocarbon monomer or substituents thereof.

The conjugated dienes useful in this invention are preferably those which contain four to six, inclusive, carbon atoms per molecule but those containing more carbon atoms per molecule, e.g. eight can also be used. These compounds include 1,3-butadiene, isoprene, piperlyene, methylpentadiene, 2,3-dimethyl-1,3-butadiene, 2,3-diethyl-1,3-butadiene, isoprene, haloprenes such as chloroprene, methylchloroprene and others. Furthermore, various alkoxy such as methoxy, and ethoxy derivatives of these conjugated dienes are applicable, i.e. 2-methoxybutadiene and 3-ethoxy-1,3-butadiene.

The vinyl aromatic monomers copolymerizable with the conjugated dienes include styrene, alpha-methylstyrene, various alkyl-substituted styrenes, vinylnaphthalene, halogen substituted styrene, alkoxy-substituted styrenes, divinyl benzenes and the like. In general, the substituted vinyl aromatic compound will not contain more than one such substituent and these substituents will generally contain not more than 3 carbon atoms, however, those vinylaromatics containing a larger number of substituents and longer chain substituents will be operable so long as the chain is not so long as to cause steric hindrance all of which is known in the art.

The vinylpyridine monomers employed in the copolymers applicable to this invention are vinylpyridines such as 2-vinylpyridine, 3-vinylpyridine and 4-vinylpyridine, alkyl-vinylpyridines, the alkyls being preferably methyl and ethyl, however, longer chain alkyl groups can be used, e.g. up to 12, also aromatic, alkene, alkadiene and alkyne substituted pyridines can be used. Examples of such substituted pyridines include 2,4,6-trimethyl-3-vinylpyridine; alpha-methylvinylpyridine; 3,4,5,6-tetramethyl-2-vinylpyridine; 3-ethyl-5-vinylpyridine; 2-methyl-5-vinylpyridine; 2,6-diethyl-4-vinylpyridine; 2-isopropyl-4-nonyl-5-vinylpyridine; 2-methyl-5-undecyl-6-vinyl-pyridine; 3-dodecyl-4-vinylpyridine; 2,4-dimethyl-5,6-diphenyl-3-vinylpyridine; and the like. Divinyl or polyvinyl compounds can also be used, however, copolymers formed from such materials are highly cross linked and would be unsuitable for a sponge rubber. Examples of such compounds include 3-ethyl-2,4-divinylpyridine, 3,5-di(alpha-methylvinyl)pyridine and the like.

All of the above recipes, monomers and the like are known to the art and no extensive discussion of polymerization conditions and the like need be made here.

This invention can best be described by referring to the drawings of which:

Figure 1 is an external grain partially in section showing how such a grain is bonded to the metal support rods;

Figure 2 is a rocket engine, partially in section, showing how an internal burning or solid grain is bonded to the metal case, and;

Figure 3 is a sectional view of an internal-external burning grain showing how said grain is bonded to its metal supports.

Referring to Figure 1, a propellant grain comprising a copolymer of a conjugated diene and a vinylpyridine as the binder is prepared in two sections 1 and 2. After curing the grain sections, the faces to be joined together are each coated with a layer 3 of a copolymer of a conjugated diene and a vinylaromatic compound. The iron rod supports 4 are each coated with a copolymer of a conjugated diene and a vinylpyridine 5. These prepared rods are then put in place and the two sections 1 and 2 are put in place over the rods 4. The two sides and ends of the assembled grain are then covered by a conjugated diene polymer 6 which will, in general, be the same as the conjugated diene polymer 3. The assembled and coated grain is then cured by the application of heat causing the copolymer layer to bond to the grain and the metal.

Referring to Figure 2, the propellant grain 7 comprising a conjugated diene-vinylpyridine copolymer as the binder is prepared by conventional methods. This grain is coated with a conjugated diene polymer 8 and is placed in engine 10. A sponge composition of a conjugated diene-vinylpyridine copolymer 9 is inserted into the space between the coating 8 and the cylinder wall 10. One means of filling this space is by use of pressure fittings, however, any method known to the art, such as pouring a liquid polymer, use of grease guns, and the like can be employed. The polymeric materials are then cured by the application of heat causing the copolymeric materials to bond to the grain and the metal casing.

Referring to Figure 3, propellant grain 11 comprising a butadiene/MVP copolymer is supported in case 12 by bonding the grain to the metal end 13 of case 12 and to spider 14. The bonding consists of a butadiene-styrene copolymer ply 15 next to the grain and a butadiene/MVP copolymer ply 16 next to the metal. That is, the use of the two ply method improves the bonding strength of the grain to the metal.

The advantages of this invention can best be described by the following examples. The 1,3-butadiene-MVP (2-methyl-5-vinylpyridine) used as the binder for the grain and also used as the bonding agent is a copolymer prepared by emulsion polymerization using the No. 2 recipe of the specification wherein 90 weight parts 1,3-butadiene is copolymerized with 10 weight parts MVP. The GR–S 1505 rubber is a copolymer prepared by emulsion polymerization of 90 weight parts 1,3-butadiene and 10 weight parts styrene and the GR–S 1009 rubber is a copolymer using emulsion polymerization of 72 parts 1,3-butadiene, 27.5 parts styrene and 0.5 part divinylbenzene. These GR–S recipes are standard recipes and are well known in the art.

A typical grain can be prepared by compounding a 90/10 butadiene/2-methyl-5-vinylpyridine copolymer with suitable vulcanization and compounding ingredients. The oxidant and activation is then incorporated therein. A typical grain formulation is as follows:

| | Weight parts |
|---|---|
| Binder | 17.5 |
| 90/10 Bd/MVP _____ Weight parts__ 100 | |
| Carbon black _____do____ 15 | |
| Dibutyl Carbitol Formal (TP-90R) _____do____ 15 | |
| Dioctyl sodium sulfosuccinate (Aerosol-OT) _____do____ 2 | |
| Dodecyl mercaptan _____do____ 2 | |
| Zinc oxide _____do____ 2 | |
| Flexamine [1] _____do____ 1 | |
| Sulfur _____do____ 1 | |
| Oxidant | 82.5 |
| Ammonium nitrate _____ Weight parts 85 | |
| Ammonium perchlorate _____do____ 15 | |
| Catalyst (Milori Blue) | 2 |

[1] 65% of a complex diarylamine ketone reaction product and 35% n,n-diphenyl p-phenylenediamine.

The dummy propellant used in these examples were prepared by the above formulation wherein the ammonium nitrate and the ammonium perchlorate were replaced with sodium chloride.

*Example I*

Several dummy propellant grains, prepared by the above formulation, 11 inches long and approximately 9 inches in diameter were cured and the surface roughed with a wire brush and wiped free of dust. The surfaces were then cleaned with benzene.

The prepared rods were wrapped with the material to be tested using a cloth tape to furnish pressure during cure. After curing the wrap was peeled from the dummy grain and the force required determined qualitatively. Each sample was run in duplicate.

Three formulations prepared by the following recipes were prepared and tested.

| | 1 | 2 | 3 |
|---|---|---|---|
| GR-S 1505 | 100 | 95 | |
| GR-S 1009 | | 5 | |
| Carbon Black | 40 | 40 | 50 |
| Sulfur | 1.5 | 1.5 | |
| Zinc Oxide | 3 | 3 | 3 |
| Stearic Acid | 1.5 | 1.5 | |
| Phenyl-beta-naphthylamine | 1.5 | 1.5 | |
| Amylbiphenyl (pentaryl A) | 10 | 10 | |
| Wood Rosin | 5 | 5 | 5 |
| Dithiocarbamate type accelerator (Butyl-eight) | 2.5 | 2.5 | |
| 90/10 Bd/MVP Copolymer | | | 100 |
| Dibutyl Phthalate | | | 30 |
| Tetrachloro-p-benzoquinone | | | 3 |

These ingredients were compounded and sheeted for wrapping the propellant grain.

The Bd/MVP copolymer formulation (3 above) formed a slightly inferior bond than did the GR-S rubber formulation. The formulation using a small amount of cross-linking agent (divinylbenzene) was somewhat superior to the other formulation.

*Example II*

To show the effect of a blowing agent in the composition (to make a sponge rubber useful in bonding grains to case), dummy propellant grains as prepared above were coated as in Example I with the exception 50 or 100 parts of ammonium carbonate per hundred parts of rubber (p.h.r.) was added to the formulation as a blowing agent. During the curing, the temperature causes the ammonium carbonate to decompose giving off $CO_2$ and thus forming gas void in the composition. The peeling test results were in the same order as in Example I and of substantially the same magnitude.

*Example III*

It has been found that when laminating a GR-S formulation to steel that a Bd/MVP formulation as prepared in Example I forms a much superior bond to both the rubber and the metal than does a GR-S formulation as prepared in Example I.

*Example IV*

A 90/10 butadiene copolymer compounded with suitable compounding agents is molded into a sheet and cured. One side of this sheet is coated with a composition such as composition 2 above and one side of a metal sheet is coated with a composition such as 3 above. The metal sheet with the coated side is placed against the coated side of the Bd/MVP copolymer and the assembly is put in a press and cured. Similarly, a Bd/MVP copolymer and a metal sheet are placed in a press with a GR-S composition such as 2 above and a second sheet and metal plate are placed in a press with a Bd/MVP such as 3 above and cured. The sheet and plate with both compositions therebetween forms a firm bond which can be separated only by the exertion of great force. In the case of the GR-S composition the separation is between the bonding agent and the metal. In both the latter cases, the force required is materially less than that required for the two bonding compositions.

We claim:

1. A method of sealing a composite propellant grain comprising an oxidant and a butadiene-2-methyl-5-vinylpyridine binder to the walls of the combustion chamber of a rocket engine, said method comprising coating the cured grain with a composition comprising an uncured polymer comprising at least 50 weight parts of a conjugated diene per 100 parts of polymer, the remaining being selected from the group consisting of vinyl-aromatic hydrocarbons and substituted vinyl-aromatic hydrocarbons, inserting the coated grain into the combustion chamber, filling the annulus between the coated grain and the combustion chamber walls with a sponge composition comprising a gas forming compound and an uncured copolymer comprising at least 50 weight parts conjugated diene and 5 to 25 weight parts of a vinylpyridine per 100 parts of copolymer, and curing the uncured compositions.

2. A method of bonding a solid polymer to a surface, said solid polymer being a copolymer having been prepared by copolymerizing 1 to 99 weight parts of an aliphatic conjugated diene of 4 to 8 carbon atoms per 100 parts monomer with 1 to 99 weight parts of a vinylpyridine selected from the group consisting of unsubstituted vinylpyridines and substituted vinylpyridines where the substituents are hydrocarbons of a maximum of 12 carbon atoms per 100 parts monomer, said method comprising coating the surface of said solid polymer to be bonded with a composition comprising an uncured polymer prepared from at least 50 weight percent of an aliphatic conjugated diene of 4 to 8 carbon atoms, the remaining monomer being a vinyl-substituted aromatic compound, said aromatic compound having an aromatic ring selected from the group consisting of the benzene ring and the naphthalene ring; coating the surface to which said solid polymer is to be bonded with an uncured copolymer prepared by copolymerizing an aliphatic conjugated diene of 4 to 8 carbon atoms and a vinylpyridine selected from the group consisting of unsubstituted vinylpyridines and substituted vinylpyridines where the substituents are hydrocarbons of a maximum of 12 carbon atoms; bringing the coated surfaces together and thereafter curing the uncured polymeric materials.

3. A method for bonding a surface of a solid polymer prepared by copolymerizing at least 50 weight parts of an aliphatic conjugated diene of 4 to 8 carbon atoms and 5 to 25 weight parts of a vinylpyridine selected from the group consisting of unsubstituted vinylpyridines and substituted vinylpyridines where the substituents are hydrocarbons of a maximum of 12 carbon atoms, said weight parts based on 100 parts total monomeric material, to a second solid surface, said method comprising coating said surface of the solid polymer with a composition comprising an uncured copolymer prepared from at least 50 weight parts per 100 parts total monomer of an aliphatic conjugated diene of 4 to 8 carbon atoms and a copolymerizable vinyl-substituted aromatic hydrocarbon, said aromatic compound having an aromatic ring selected from the group consisting of the benzene ring and the naphthalene ring; coating said second surface with an uncured polymer prepared by copolymerizing at least 50 weight parts of an aliphatic conjugated diene of 4 to 8 carbon atoms with 9 to 25 weight parts of a vinylpyridine selected from the group consisting of unsubstituted vinylpyridines and substituted vinylpyridines where the substituents are hydrocarbons of a maximum of 12 carbon atoms per 100 parts monomer; bringing the two coated surfaces together and thereafter curing the uncured polymeric composition.

4. A method of bonding the surface of a cured rubber composition having been prepared by copolymerizing at least 50 weight parts of 1,3-butadiene with 5 to 25 weight parts of 2-methyl-5-vinylpyridine per 100 parts total monomer to a second surface, said method comprising coating the surface of said rubber with a composition comprising an uncured copolymer prepared by copolymerizing at least 50 weight percent per 100 total parts monomer of 1,3-butadiene and the remainder of said polymer being styrene, coating said second surface with an uncured copolymer prepared by copolymerizing at least 50 weight parts 1,3-butadiene with 5 to 25 weight parts of 2-methyl-5-vinylpyridine per 100 parts monomer, bringing the two surfaces together and curing the uncured polymeric compositions.

5. The method of claim 4 wherein said second surface is a metal.

6. A method of bonding a cured propellant grain to a metal support, said grain comprising an oxidant and a copolymer of an aliphatic conjugated diene of 4 to 8 carbon atoms with a vinyl-substituted pyridine selected from the group consisting of unsubstituted vinylpyridines and substituted vinylpyridines where the substituents are hydrocarbons of a maximum of 12 carbon atoms as the binder, said method comprising coating said grain with a composition comprising an uncured polymer prepared by copolymerizing at least 50 weight parts of an aliphatic conjugated diene of 4 to 8 carbon atoms per 100 parts total monomer with a vinyl-substituted aromatic hydrocarbon, said aromatic compound having an aromatic ring selected from the group consisting of the benzene ring and the naphthalene ring, coating the metal support with an uncured copolymer prepared by copolymerizing at least 50 weight parts of an aliphatic conjugated diene of 4 to 8 carbon atoms with 5 to 25 weight parts of a vinyl-substituted pyridine selected from the group consisting of unsubstituted vinylpyridines and substituted vinylpyridines where the substituents are hydrocarbons of a maximum of 12 carbon atoms per 100 parts monomer, bringing the two surfaces together and curing the said uncured composition.

7. A laminated structure comprising a first layer comprising a copolymer of an aliphatic conjugatd diene of 4 to 8 carbon atoms and a vinyl-substituted pyridine selected from the group consisting of unsubstituted vinylpyridines and substituted vinylpyridines where the substituents are hydrocarbons of a maximum of 12 carbon atoms; a second layer comprising a polymer prepared by polymerizing at least 50 weight parts of an aliphatic conjugated diene per 100 parts monomer with the remainder of the monomer being a vinyl-substituted aromatic hydrocarbon, said aromatic compound having an aromatic ring selected from the group consisting of the benzene ring and the naphthalene ring; a third layer comprising at least 50 weight parts of an aliphatic conjugated diene with 5 to 25 weight parts of a vinyl-substituted pyridine selected from the group consisting of unsubstituted vinylpyridines and substituted vinylpyridines where the substituents are hydrocarbons of a maximum of 12 carbon atoms per 100 parts monomer; and a fourth layer comprising a solid, each of said layers being bonded to the adjacent layer.

8. The structure of claim 7 wherein the conjugated dienes are 1,3-butadiene, the vinyl-substituted aromatic hydrocarbon is styrene, the vinyl-substituted pyridine is 2-methyl-5-vinylpyridine, and the fourth layer is a metal.

9. A rocket grain bonded to a metal support, said grain comprising a copolymer of 1,3-butadiene and 2-methyl-5-vinylpyridine as the binder and an oxidant; the said grain being bonded to said metal support by means of a two-ply bonding composition; the ply adjacent said grain and being bonded thereto comprising a copolymer prepared by copolymerizing at least 50 weight parts of an aliphatic conjugated diene of 4 to 8 carbon atoms per 100 parts monomer with the remaining monomer being a vinyl-substituted aromatic hydrocarbon, said aromatic compound having an aromatic ring selected from the group consisting of the benzene ring and the naphthalene ring, and the ply adjacent the metal support and being bonded thereto comprising a copolymer prepared by copolymerizing at least 50 weight parts of an aliphatic conjugated diene of 4 to 8 carbon atoms with 5 to 25 weight parts of a vinyl-substituted pyridine selected from the group consisting of unsubstituted vinylpyridines and substituted vinylpyridines where the substituents are hydrocarbons of a maximum of 12 carbon atoms per 100 parts monomer and each of said layers being bonded one to the other.

10. The bonded propellant grain of claim 9 wherein the ply adjacent said grain is a copolymer of 1,3-butadiene and styrene, and the ply adjacent said metal support is a copolymer of 1,3-butadiene and 2-methyl-5-vinylpyridine.

11. The bonded propellant grain of claim 9 wherein the ply adjacent said grain comprises (a) a major proportion of a copolymer of 1,3-butadiene and styrene, and (b) a minor proportion of a copolymer prepared by copolymerizing a major proportion of 1,3-butadiene, a minor proportion of styrene and a lesser proportion of divinyl benzene; and the ply adjacent said metal support is a copolymer of 1,3-butadiene with 2-methyl-5-vinylpyridine.

12. A method of bonding a solid polymer to a surface, said solid polymer being a copolymer having been prepared by copolymerizing 1 to 99 weight parts of a monomer selected from the group consisting of aliphatic conjugated dienes of 4 to 8 carbon atoms, halogen-substituted conjugated dienes of the foregoing types, methoxy and ethoxy derivatives of such conjugated diene with 1 to 99 weight parts of a monomer selected from the group consisting of vinyl and divinyl pyridines and such pyridines being substituted with a radical selected from the group consisting of alkyls of 1 to 12 carbon atoms, aromatic ring, alkene, alkadiene, and alkyne radicals, said weight parts being based on 100 weight parts total monomer; said method comprising coating the surface of said polymer with a composition comprising an uncured polymer prepared by polymerizing a monomer selected from the group consisting of aliphatic conjugated dienes of 4 to 8 carbon atoms, halogen, methoxy and ethoxy derivatives of such conjugated dienes with the remaining monomer being selected from the group consisting of vinyl and divinyl-substituted aromatic compounds, alkyl, alkoxy, and halogen-substituents of such aromatic compounds; coating the surface to which said solid polymer is to be bonded with an uncured copolymer prepared by copolymerizing a monomer selected from the group consisting of aliphatic conjugated dienes of 4 to 8 carbon atoms, halogen, methoxy and ethoxy derivatives of such conjugated dienes and a monomer selected from the group consisting of vinyl and divinylpyridines and such pyridines containing a substituent selected from the group consisting of alkyls of 1 to 12 carbon atoms, aromatic, alkene, alkadiene and alkyne radicals; bringing the coated surfaces together and thereafter curing the uncured polymeric material.

References Cited in the file of this patent

UNITED STATES PATENTS

| | | |
|---|---|---|
| 2,497,045 | Killingsworth | Feb. 7, 1950 |
| 2,561,215 | Mighton | July 17, 1951 |
| 2,615,826 | Mallory | Oct. 28, 1952 |

FOREIGN PATENTS

| | | |
|---|---|---|
| 596,108 | Great Britain | Dec. 29, 1947 |